March 16, 1971  R. DOYLE  3,570,057
ADJUSTMENT OF VOLUME OF BLOW MOLDED CONTAINERS
AND MOLD FOR SO DOING
Filed May 24, 1968  2 Sheets-Sheet 1

INVENTOR.
ROBERT DOYLE
BY *Young & Quigg*
ATTORNEYS

March 16, 1971 R. DOYLE 3,570,057
ADJUSTMENT OF VOLUME OF BLOW MOLDED CONTAINERS
AND MOLD FOR SO DOING
Filed May 24, 1968 2 Sheets-Sheet 2

INVENTOR.
ROBERT DOYLE

BY *Young & Quigg*

ATTORNEYS

United States Patent Office 3,570,057
Patented Mar. 16, 1971

3,570,057
ADJUSTMENT OF VOLUME OF BLOW MOLDED CONTAINERS AND MOLD FOR SO DOING
Robert Doyle, Overland Park, Kans., assignor to Phillips Petroleum Company
Filed May 24, 1968, Ser. No. 731,814
Int. Cl. B29d 23/03
U.S. Cl. 18—5                                  6 Claims

ABSTRACT OF THE DISCLOSURE

The bottom of a mold is provided with means permitting the container bottom to be molded to different contours or shapes or concavities by providing a removable and replaceable or interchangeable bottom or mold insert which can be varied. The insert also serves as the pinch off. A disc-shaped or annular-shaped insert, which can be made adjustable so the small volume changes can be made without changing inserts, is provided also.

---

Figure 1:
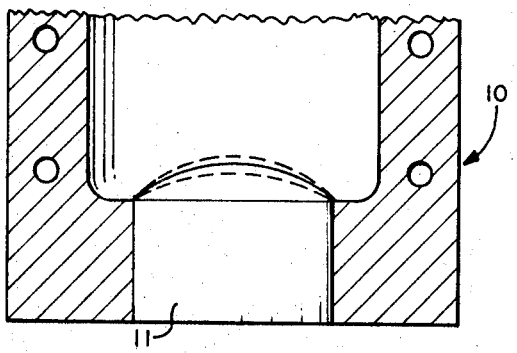

This invention relates to the formation of blow molded containers. In one of its aspects it relates to the blow molding of containers as from plastic material in a manner to insure a more precise volume thereof without completely changing the mold being used and without changing the appearance of the container to be molded, especially where there is a tendency on the part of the material, e.g., plastic, from which the container is to be molded to cause significant dimensional changes due to variations in the specific type of starting material, changes in production conditions, climatic and seasonal changes, and other factors which are not now necessarily well understood.

In one of its concepts the invention provides a mold having an adjustable bottom surface wherewith to blow mold a bottle, as from plastic, without changing the overall appearance of the bottle when viewed in its normal standing position. In another of its concepts the invention provides a mold assembly in which there is provided a series of interchangeable bottom portions. In a still further concept the invention provides a mold having in the bottom portion thereof a frusto conical element or ring or other moveable shape projecting upwardly into the mold. In a still further concept of the invention it provides an adjustable member which can be carefully adjusted as with an adjustment screw so as to penetrate more or less into the mold cavity and thus therein to alter the configuration of the bottom of the container without in any way altering the appearance of the container except somewhere at or on its bottom. In a still further concept of the invention the insert or adjustable member here disclosed serves as the "pinch off" for the mold as further described herein.

Many common products such as milk and motor oil are sold in containers which must deliver the correct legal volume. If not, the seller may be subject to severe penalties. Excessive volumes are also costly since the seller then "gives away" considerable product over a period of time. Thus, the volume must be very closely controlled. However, it is difficult to achieve this close control if the container is blow molded from one of the thermoplastics. These organic materials, and especially those which may become highly crystalline like polyethylene, are subject to significant dimensional changes due to variations in the specific type of starting material, changes in production conditions, climatic and seasonal changes, and other factors which may not be well understood.

To offset those factors which cannot otherwise be regulated and to make that last adjustment to give the correct legal volume in the finished container, various procedures are followed. One is to leave some latitude in the mold fabrication for final machining to finished dimensions. This procedure is not sufficiently flexible. Another common procedure is to insert suitable shims between the sections of the mold halves. But this alters the overall dimensions of the finished containers and can often be objectionable from that standpoint.

It has now occurred to me that in order to provide complete flexibility in adjustment to the desired volume of a particular container now or at some time in the future, yet nevertheless avoiding any changes in outward appearance or dimensions of the container in upright position, the bottom of the container should be altered in shape, for example, that the bottom be given an increased concavity or other shape when it is desired to reduce the volume of the container and vice versa when it is desired to increase the volume of the container. To this end it has occurred to me that I should provide an adjustable member protruding into the mold. In lieu of an adjustable member, it has occurred to me to employ interchangeable mold bottom portions. Thus, by altering the curvature or other shape of the bottom of the container, one can adjust it to the volume as desired in a simple, yet highly effective manner witlhut in any way having to alter the coaction between the mold halves and without in any way altering the aspect of the container when viewed in its normal or upright position.

An object of this invention is to produce a blow molded container such as a bottle. It is another object of this invention to construct a mold for blow molding containers. It is a further object of this invention to construct a mold in which or with which containers of different volumes can be blow molded without radically changing the mold and without in any way changing the appearance of the container or bottle viewed in its upright position.

Other aspects, concepts, and objects, as well as the several advantages of the invention are apparent from a study of this disclosure, the drawing and the appended claims.

According to the present invention there is constructed a mold having a variable bottom configuration. In one embodiment replaceable and/or adjustable inserts are built into the bottom of the mold whereby to alter the configuration of the bottom of the container or bottle blow molded therein. In another embodiment of the invention there are attached into the bottom of the mold cavity, that is that portion of the mold which molds the bottom of the container or bottle, removable inserts, e.g., frusto conical or cylindrical or other shaped inserts to vary the volume of the mold cavity and therefore of the container blow molded therein. The height of the inserts and/or their diameters or other shapes can be varied to attain the volume desired. In a now preferred embodiment there is built into the mold bottom an adjustable circular ring which telescopically rises from or recedes into the mold bottom. Preferably, the ring is concentrically disposed in the bottom of the mold. For movement of the ring telescopically within the circular groove, there is provided an adjustment screw and lock nut arrangement, later more fully described, the screw being anchored into the ring so as to move the ring telescopically into or out from the mold bottom. In its preferred form, the ring will have symmetrically disposed three or more of such said screws so that the ring can be adjusted to uniformally extend above the mold bottom and, as the case may be, uniformally recede into the circular receding groove so as to increase beyond the regular shape of the mold the volume of the container which can be blow molded therein, also as more fully described later.

One skilled in the art in possession of this disclosure will be able to supply within the scope of its teaching and the appended claims different or alternative structures which will reach the same desired objective.

Further, it will be obvious from the description which follows that the pinch off of the mold bottom can remain as earlier provided or can be made integral with the insert or even the ring or other insertable, adjustable and/or replaceable member.

Figure 2:
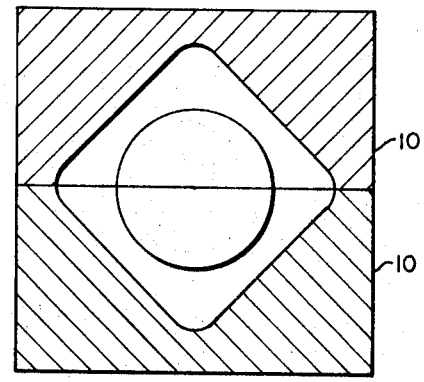
Figure 3:
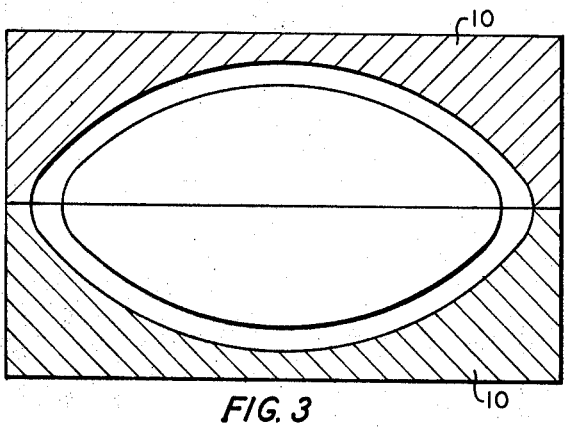
Figure 5:
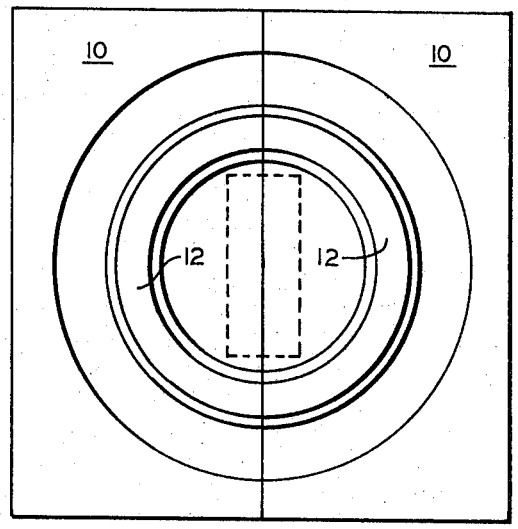
Figure 4:
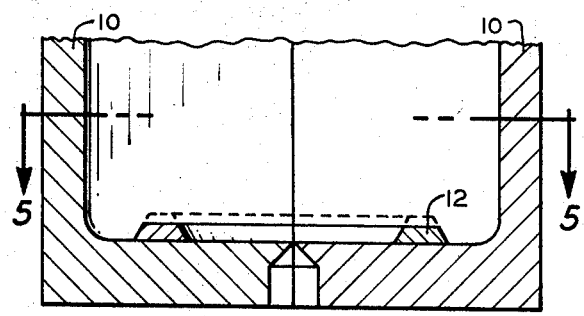
Figure 6:
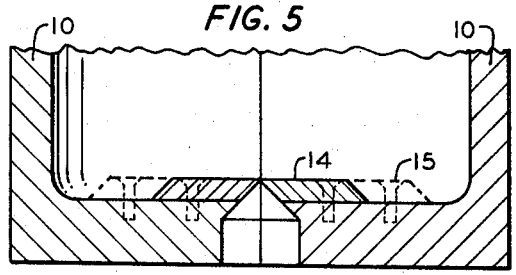
Figure 7:
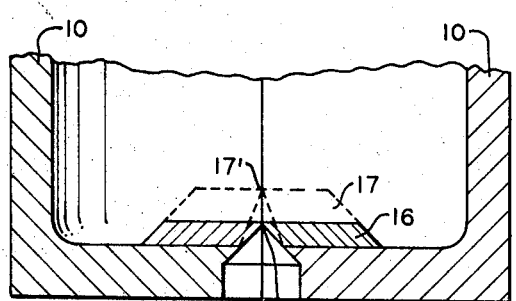
Figure 8:
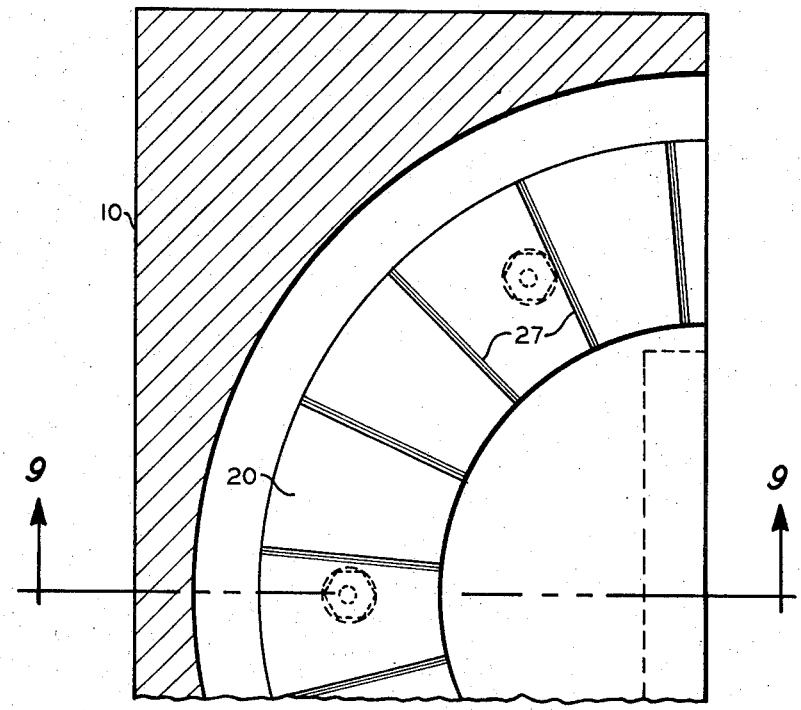
Figure 9:
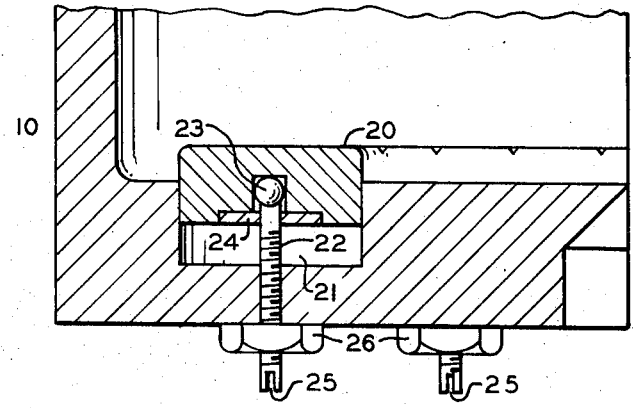

FIG. 1 is a vertical cross-sectional or elevational view of a mold according to the invention in which interchangeable inserts are provided. FIGS. 2 and 3 are horizontal cross-sectional views of square and oval bottle molding molds, respectively. FIG. 4 is a vertical cross-sectional view of the bottom of a mold showing a substantially concentrically disposed insert within the mold. FIG. 5 is a plan view taken in FIG. 4 along the line 5—5. FIG. 6 is a vertical cross-sectional view of the bottom of a mold showing how frusto conical inserts of increasing diameter can be screwed into the bottom of the mold halves. FIG. 7 is a similar cross-section showing how inserts of increasing height and adjusted pinch off cutting edge can be placed into the mold bottom. FIG. 8 is a view of a quadrant of the bottom of a mold containing an adjustable volume adjustment ring which can be adjusted with an adjustment screw as earlier stated. FIG. 9 is a vertical cross-sectional cut of FIG. 8 taken along line 9—9.

Referring now to FIG. 1, the mold 10 is equipped with interchangeable insert portion 11. As shown by the dotted lines, the inserts can be of increased or decreased convexity thus to reduce or to increase, respectively, the volume of the container molded in the mold. In FIGS. 2 and 3, the insert area for a mold of FIG. 1 is shown.

In FIGS. 4 and 5 are shown ring-type inserts which do not in any way affect the pinch off portion of the mold. As shown in FIGS. 4 and 5 mold 10 can contain frusto conical ring 12. Ring 12 can be made with varying heights and/or varying widths measured on its cross section. In FIGS. 6 and 7 are shown rings which can be of increasing diameter as shown at 14 and 15. These rings can be screwed to the bottom of the mold for ready dismantling or insertion. In FIG. 7 the ring is shown of increasing height and the pinch off or cutting edge is made integral with the insert. Thus, rings 16 and 17 are respectively provided, for use at different times, and are each of them provided with pinch or cut off edge 16' and 17', respectively.

Finally, in FIGS. 8 and 9 the mold 10 is provided with volume adjustment ring 20 within ring receiving groove 21. To the underside of the ring at several portions, as indicated in FIG. 9, there is fastened in pivotable manner adjustment screw 22 having head 23 retained within the ring 20 by means of adjustment screw and retainer 24. A screw driver slot 25 and adjustment screw lock nut 26 are provided for retaining the adjustable volume adjustment ring 20 at any given adjustment. The relative size and proportions are so designed that the ring can protrude as shown in the drawing. One skilled in the art will understand that by use of the adjustment screw it is possible to lower the adjustable volume adjustment ring 20 so that there will be in fact a cavity thereabove the width of which will be equal to that of the groove into which the adjustment ring 20 has been caused to recede. In this manner the container or bottle bottom will have a ring upon which to rest. With such a ring on the bottle bottom an adjustment of its depth, when desired, can be made to vary effectively the final volume of the bottle while retaining such a ring on which the bottle can rest. For ventilation or drainage purposes ring 20 can be provided with grooves 27 across its top so that the bottle will rest actually on a number of rather small edges. Or as desired, a number of substantially radial or similarly disposed ridges can be machined into the face or top of the adjustment ring so as to provide relatively small cuts or grooves in the bottom of the ring on which the bottle rests when made. This has been indicated in FIG. 8 by groove 27.

One skilled in the art having studied this disclosure and understanding the changes which can take place as when a container is blow molded from one of the thermoplastics will be able readily to calculate for each instance the overall sizes of the respective replaceable inserts or adjustment rings or other shapes. An advantage of the invention is that these calculations need not be overly accurately made because one can proceed by trial and error rapidly to determine which replaceable insert is best suited to most accurately reach the desired ultimate volume. Or, as in the case of FIG. 9, one can readily adjust very carefully the final volume of the container to be blow molded.

EXAMPLE I

A nominal one-gallon blow molded polyethylene milk bottle has a generally square cross-sectional shape with rounded corners and a rounded shoulder section, a circular cross-section neck portion and a concave bottom portion. The cross-section of the mold is similar to that of FIG. 2. A series of inserts similar to that shown in FIG. 7 are made which incrementally change the internal volume of the bottle by about 0.001 gallon each.

During production a change is made in the polymer from which the bottles are being made which causes the volume of the bottle to increase which causes the level of the milk for a one-gallon charge to drop about ¼ inch in the 1¾ diameter neck of the bottle giving the appearance that the bottle is not as full as it should be. It is desired to change the volume of the bottle made from the new resin to bring the milk to the same level in the new bottle as in the old bottle without changing the external dimensions of the bottle appreciably so that no adjustment of the filling and capping machinery is necessary. A change in the mold volume is made by replacing the insert in the mold with a bottom insert which decreases the internal volume by 0.002 gallon. The new bottles have essentially the same height as the old bottles and a one-gallon charge brings the milk to within about ⅟₁₆ inch of the same level in the neck of the new bottles as in the old, no other changes in the molding, filling, or capping steps being necessary.

EXAMPLE II

A nominal one-gallon industrial round bottle blow molded of polyethylene has an annular concave portion in the bottom. The mold for producing this bottle is similar to that shown in FIGS. 8 and 9. The annular ring being 5 inches in outside diameter and 3 inches in inside diameter and projecting from the bottom of the mold approximately ¼-inch. The round neck portion of the bottle is about one inch in inside diameter. As a result of a change from one polyethylene resin to another during production, the bottle volume decreased slightly causing a one-gallon charge of anti-freeze to come one-half-inch above the normal fill line in the neck of the bottle. The adjustable semi-circular rings in the bottom of each mold half are lowered about .030 inch and the mold tried in production. The one-gallon charge comes almost precisely to the normal fill line when production is resumed.

Reasonable variation and modification are possible within the scope of the foregoing disclosure, the drawing and the appended claims to the invention the essence of which is that there has been provided a mold for blow molding containers such as bottles, said mold having replaceable inserts in its bottom and/or one or more members affixed to said bottom in permanent but readily removable and replaceable manner and/or affixed in readily adjustable manner substantially as described thus to produce blow molded containers or bottles which viewed in upright position appear to be identical but which actually have varying volumes as may be desired.

I claim:

1. A mold for blow molding containers of different volumes without visually changing the exterior appearance of said containers so they will appear to be substantially alike in size when standing upright on their bottoms, said mold having a variably adjustable bottom wall therein, said bottom wall being the wall against which the container bottom is formed.

2. A mold according to claim 1 wherein the bottom of the mold is equipped with an adjustable member whereby to effectively vary the internal volume of the mold.

3. A mold according to claim 1 wherein there is positioned within the mold bottom one of several different sized rings having a desired configuration.

4. A mold according to claim 1 wherein there is placed into the bottom of the mold in demountable fashion a frusto conical ring.

5. A mold according to claim 4 wherein the frusto conical ring has a portion which acts as pinch off.

6. A mold according to claim 1 wherein in the bottom of the mold there is provided a groove, there is provided within the groove an adjustable volume adjustment ring, the adjustable volume adjustment ring is telescopically mounted in said groove, the adjustable volume adjustment ring is provided with an adjustment screw, said adjustment screw extends to without the mold whereby the position of the ring within the groove can be adjusted as may be desired from the exterior of the mold.

References Cited

UNITED STATES PATENTS

| | | | |
|---|---|---|---|
| 2,314,176 | 3/1943 | Talalay | 249—82 |
| 3,354,509 | 11/1967 | Ammondson | 18—35 |

H. A. KILBY, JR., Primary Examiner